United States Patent [19]

Brain et al.

[11] Patent Number: 4,532,143

[45] Date of Patent: Jul. 30, 1985

[54] SPREADABLE HONEY

[75] Inventors: Charles Brain, Wooster; Barry Johnston, Copley, both of Ohio

[73] Assignee: The J. M. Smucker Company, Orrville, Ohio

[21] Appl. No.: 621,176

[22] Filed: Jun. 15, 1984

[51] Int. Cl.³ .......................... A23L 1/06; A23L 1/08; A23L 1/04
[52] U.S. Cl. ..................................... 426/577; 426/658
[58] Field of Search .............................. 426/577, 658

[56] References Cited

U.S. PATENT DOCUMENTS

| | | | |
|---|---|---|---|
| 2,594,439 | 4/1952 | Baker | 426/577 |
| 2,902,370 | 9/1959 | White | 99/171 |
| 3,369,551 | 2/1968 | Carroll | 131/2 |
| 3,851,067 | 11/1974 | Bryan | 426/90 |
| 4,004,040 | 1/1977 | Puta | 426/564 |
| 4,021,583 | 5/1977 | Arden | 426/134 |

FOREIGN PATENT DOCUMENTS

| | | |
|---|---|---|
| 47-15 | 1/1972 | Japan . |
| 53-81665 | 7/1978 | Japan . |
| 55-165760 | 12/1980 | Japan . |

*Primary Examiner*—Jeanette Hunter
*Attorney, Agent, or Firm*—Body, Vickers & Daniels

[57] ABSTRACT

A semi-gelled honey composition which is spreadable and which will not crystallize, is prepared by combining honey with low and high methoxyl pectins in the absence of added alkaline earth metal cations and acid. The ratio of low-to high-methoxyl pectins may range from 1:1 to 5:1.

20 Claims, No Drawings

SPREADABLE HONEY

This invention relates to semi-gelled honey compositions. More particularly, this invention relates to compositions containing honey, water and pectin which are spreadable, not sticky or adhesive, maintain their shape and do not flow, which have a long shelf life and which have the organoleptic attributes of 100% honey.

BACKGROUND

Honey is one of the oldest foods known to man, being eaten both for its palatability and its nutritive value. As a food ingredient, honey has fine flavor and the image of old fashioned goodness. Honey does have some negative attributes associated with its use. The two major criticisms of honey are handling problems and its natural affinity to return to a crystallized state.

In its natural form, honey is a viscous, sticky, adhesive fluid which can be slowly poured and/or spread onto a surface and which continues to flow after it has been applied to a surface. Honey is difficult to pour or spoon due to its adhesiveness and stickiness. Honey can be heat processed to delay granulation for 6 to 18 months but eventually some coarse crystals will accumulate. The extent of this granulation is known to be related to glucose (dextrose hydrate) supersaturation.

Honey can be described as the nectar and saccharine exudations of plants, gathered, modified and stored in the comb by honey bees. Through a combination of evaporation and sucrose inversion, the nectar, which contains about 60%-80% water, is concentrated to about 17-18% water. At the same time, enzymes in the honey stomach of the bee convert a majority of the sucrose in the nectar to fructose and glucose. Comb honey is honey still retained in the cells of the comb. Processed honey is honey separated from the comb; either extracted from the uncrushed comb by gravity or centrifugal force or strained from crushed comb.

Honey differs widely in its chemical composition depending on the plant source and on the bee which converts the nectar to honey. The range of honey components and their average values are listed in table I.

TABLE I

| Components | Range (%) | Average (%) |
|---|---|---|
| Water | 13–23 | 17 |
| Fructose | 23–44 | 38 |
| Glucose (Dextrose) | 22–41 | 31 |
| Sucrose | 0.2–8 | 1.3 |
| Other Sugars | 3–24 | 9 |
| pH | 3.8–4.2 | 4 |

Pectin is a complex polysaccharide (principally D-galacturonic acid) with a molecular weight in the range of 60,000 to 150,000, depending on the plant source. The polyglacturonic acid is partially esterified with methoxyl groups. The ratio of methoxylated galacturonic acid groups to total galacturonic acid groups is termed the "degree of methoxylation" (DM). Commercial pectins are divided into two main groups - high-methoxyl (HM) pectins and low-methoxyl (LM) pectins. Typically, the HM pectins have a DM range of 60-75%, while LM pectins have a DM range of 25-45%.

Pectin is a commonly used gelling agent for carbohydrate solutions. High-methoxyl pectin will gel sugar solutions containing 55-70% or more sugar, but require a pH of about 3.4 or below. It has been suggested that the gelling action of pectin occurs from physical or chemical changes that decrease the solubility of the pectin, resulting in local crystallization. For high-methoxyl pectins, the required changes are brought about by the addition of sugar and hydrogen ions. Addition of alkaline metal earth cations, usually calcium, is sufficient to induce the gelation of low-methoxyl pectins.

High-methoxyl pectin gels are plastic, have high elasticity and have good flavor release. These pectins will gel sugar solutions having a minimum of 55% soluble solids within a pH range of 2.0 to 3.4. In general it is necessary to adjust the pH below 3.5 to achieve proper gelation with high-methoxyl pectins.

Low-methoxyl pectin gels vary in texture with calcium ion concentration and solids. At low calcium concentrations, soft, coherent gels are formed. At high calcium concentrations, gels are hard and brittle. These pectins are less dependent than high-methoxyl pectins on sugar content and pH to form proper gels.

A number of experimentors have attempted to utilize the gelling properties of pectin in honey containing compositions.

Hoshino, in Japanese publication No. Sho47/1972-15, Jan. 15, 1972, describes a honey and butter composition which gels upon the addition of pectin and so retains its shape instead of flowing. Hoshino adds either a high-methoxyl pectin, in quantities of 0.5% or more, in conjunction with small quantities of acid, or a low-methoxyl pectin which has been treated and which is combined with alkaline earth metals.

Shimizu, in Japanese publication No. Sho53/1978-81665, July 19, 1978, describes a fruit jelly and honey composition which is mixed with 1.4% to 2.0% pectin and citric acid and the pH adjusted to 3.1±0.5. This composition does not require a preservative and does not form a surface film.

Shimizu, in Japanese publication No. Sho55/1980-1165760, Dec. 24, 1980, describes a crystalline honey composition and a method of artificially crystallizing honey. Shimizu adds low-methoxyl pectin to honey, then adds a calcium salt solution as a nucleus for the crystallization of the honey. The gelled honey product is stablized by the pectin.

White, U.S. Pat. No. 2,902,370, Sept. 1, 1959, uses pectin to coat honeycomb in a comb honey product, to prevent the honeycomb from serving as a nucleation site for granulation.

Bryan, U.S. Pat. No. 3,851,067, Nov. 25, 1974, uses pectin gels and honey to coat citrus halves.

Arden, U.S. Pat. No. 4,021,583, uses honey and pectin in a fruit flavored frozen confection.

These references do not however, describe a method for producing a semi-gelled honey product which maintains all the desirable characteristics of honey, i.e. flavor, color and sweetness, while at the same time having improved textural qualities which enable it to be spread easily and which prevent crystallization. There is a continuing need for a spreadable honey with good keeping properties.

The present invention overcomes the difficulties experienced by the compositions of the prior art, maintaining all the desirable organoleptic characteristics of honey, while at the same time making it easy to handle and spread and increasing its shelf life.

BRIEF SUMMARY OF THE INVENTION

The present invention contemplates a spreadable honey composition with enhanced keeping properties and with the flavor, color and sweetness qualities of unprocessed honey. Surprisingly, it has been discovered that this can be done utilizing conventional gelling products, but only when used in the specific proportions disclosed in this patent.

It has now been found that satisfactory spreadable honey compositions can be obtained without the use of added acid or bivalent alkaline earth metal cations by utilizing an appropriate ratio of high-and low-methoxyl pectins. The honey composition which is produced by this method maintains all the desirable characteristics of honey, while at the same time enables it to be spread easily. Further, the honey composition does not crystallize even after long standing. It has been found that the compositions of this invention can be prepared utilizing low-and high-methoxyl pectins where the ratio of low- to high-methoxyl pectins varies from 1:1 to 5:1, where the amount of pectin added to the honey composition ranges from 0.5% to about 3% by weight of the composition, where the percent solids in the honey component of the composition ranges from 50% to about 75%, where the pH is that which is inherent in and normal for the honey used and where the glucose supersaturation, expresses as the dextrose-water ratio, is 1.7 or less.

DETAILED DESCRIPTION OF THE INVENTION

The honey composition in our invention comprises honey, water and pectin.

Honey may be characterized by its soluble solids content. Typically, processed honey will have a solids content in a range of 77–85%. At this level, the dextrose-water ratio of the honey is above 1.7 and, after a period of time, the honey will granulate or crystallize. Reducing the solids content of processed honey with water will lower the dextrose-water ratio to below 1.7 and prevent crystallization, but will produce a watery appearing product.

We have now found that the solids content of the honey can be decreased so that the dextrose-water ratio is below 1.7 while retaining the palatability of the honey composition by adding appropriate amounts of low and high-methoxyl pectin to the honey.

The solids content of the honey composition of our invention is in the range of from about 50% to about 75%, preferably from about 60% to about 70% and most preferably from about 62% to about 68%.

Water is added to the honey composition and serves two purposes: it acts as a solvent for the pectin and it is used to control the solids content of the composition. The quantity of water is chosen to provide a preselected solids content and dextrose-water ratio in the honey composition. Ideally, to avoid any flavor degradation in the finished product, deionized water should be used in the process. It is however, possible to use any potable water recognizing that high ion concentrations may impart an off-flavor to the finished product.

Typically, the pH of the honey composition is about 3.6. One of the benefits of this invention is that acid will ordinarily not need to be added to the honey composition, unlike the conventional teaching where the pH must be reduced below 3.5, and in some systems below 3.0. It will, however, be recognized by those skilled in the art that acid may be added if desired and that a honey composition having a substantially more alkaline pH than usual will advantageously be treated with acid.

The pectin used is a combination of low-methoxyl and high-methoxyl pectin. Surprisingly, a combination of these pectins, when used in a specified range, provides enhanced properties, rather than those expected. Unexpectedly, when a combination of high-and low-methoxyl pectins is used, it is not necessary to add acid to lower the pH to 3.5 or below, or to add polyvalent metal cations, such as calcium, to the honey composition.

Both the high-and low-methoxyl pectins are conventional food grade materials commercially available from many sources. The high-methoxyl pectin will have about 60% to about 75% of the available carboxyl groups on the galacturonic acid molecule esterified with methoxyl groups. The low-methoxyl pectin will have from about 25% to about 45% of the available carboxyl groups esterified with methoxyl groups.

The ratio of low-methoxyl pectin to high-methoxyl pectin must be held in the range of from about 1 to about 5 parts low-methoxyl pectin per part of high-methoxyl pectin. It is preferable that from about 1.5 to about 4.5 parts of low-methoxyl pectin are used per part of high-methoxyl pectin and it is most preferable that from about 2.5 to about 4.5 parts of low-methoxyl pectin are used per part of high-methoxyl pectin.

The amount of pectin added to the honey composition may vary widely. A minimum of about 0.5% by weight of the composition is necessary to obtain the benefits of our invention. Above about 3% by weight pectin, no further benefits are obtained and the consistency of the composition becomes less satisfactory. We prefer to use from about 0.5% to about 2% pectin and most prefer to use from about 0.75% to about 1.25%.

The honey composition is made by adding the selected quantities of pectin to hot water to form a slurry. Honey is warmed in a separate container and the pectin slurry is added to the warmed honey. The resulting mix is heated to temperatures in the range of 150°–200° F. with agitation until uniformity is obtained.

The honey composition is deaerated under vacuum and sufficient water is added to adjust the soluble solids content to the desired level. The honey composition may then be packaged and pasteurized.

The following nonlimiting Examples illustrate in more detail a preferred embodiment of the honey composition and process of the present invention.

EXAMPLE I

A honey composition was formulated using the following ingredients and quantities:

| Ingredient | Quantity (wt. %) |
| --- | --- |
| Clover Honey 82% Solids | 80 |
| L.M. Pectin 150 Grade | 0.75 |
| H.M. Pectin 150 Grade | 0.25 |
| Water | 19 |

The water was heated to 190° F. The low-and high-methoxyl pectins were slowly added to the hot water and blended under agitation for 5 minutes to form a slurry. In a separate vessel, processed honey was heated to 160° F. The pectin slurry was pumped by displacement pump into the warmed honey. Agitation and low heat were applied until a uniform mix at 180° F. was obtained.

The honey composition was then deaerated in a vacuum kettle using 25 in. Hg vacuum at 150° F. The finished honey composition was standardized by adding water, to 66.4% soluble solids, read by refractometer. The honey spread was packaged and then pasteurized to a specified exposure and rapidly cooled.

The honey was elastic, tender and had a soft, yielding texture. The honey spread had excellent melt down on the palate.

EXAMPLE II

The honey composition of Example I was subjected to refrigerated storage conditions of 2° to 4° C., the optimum temperature for crystallization for one year. Periodic sample evaluations of the composition revealed no evidence of the formation of crystals.

SUMMARY

These Examples demonstrate that a honey composition of this invention is easily made using the novel combination of ingredients disclosed, that such composition has a long shelf life, that the composition is spreadable and that there is no diminution of taste qualities.

Having thus described our invention, we claim:

1. In a spreadable honey composition comprising honey and pectin, the improvement which comprises a mixture consisting of low-methoxyl pectin and high-methoxyl pectin in a ratio in the range of from about 1 part to about 5 parts low-methoxyl pectin per part of high-methoxyl pectin.

2. The composition of claim 1 wherein from about 1.5 to about 4.5 parts of low-methoxyl pectin are utilized per part of high-methoxyl pectin.

3. The composition of claim 1 wherein from about 2.5 to about 4.5 parts of low-methoxyl pectin are utilized per part of high-methoxyl pectin.

4. The composition of claim 1 wherein the soluble solids in the composition are in the range of from about 50% to about 75%.

5. The composition of claim 1 wherein the soluble solids in the composition are in the range of from about 60% to about 70%.

6. The composition of claim 1 wherein the soluble solids in the composition is in the range of from about 62% to about 68%.

7. The composition of claim 1 wherein the dextrose-water ratio is less than 1.7.

8. The composition of claim 1 wherein the total amount of pectin added is in the range of from about 0.5% to about 3% by weight of the composition.

9. The composition of claim 1 wherein the total amount of pectin added is in the range of from about 0.5% to about 2% be weight of the composition.

10. The composition of claim 1 wherein the total amount of pectin added is in the range of from about 0.75% to about 1.25% by weight of the composition.

11. The composition of claim 1 wherein the composition is substantially free of supplemental acid or alkaline earth metal cations.

12. A spreadable honey composition comprising: honey; a pectin mixture consisting of a mixture low-methoxyl pectin and a high-methoxyl pectin with the ratio of the low-methoxyl pectin to the high-methoxyl pectin being in the range of about 1:1 to 5:1; and, water sufficient to provide a preselected solids content and dextrose-water ratio, said composition being substantially free of supplemental acid or alkaline earth metal cations.

13. The honey composition as recited in claim 12 wherein said dextrose-water ratio is below a level promoting crystallization.

14. The spreadable honey composition as recited in claim 12 wherein said dextrose-water ratio is below about 1.7.

15. The spreadable honey composition as recited in claim 13 wherein said predetermined solids content is below about 90% of the solids content of processed honey.

16. The spreadable honey composition as recited in claim 14 wherein said predetermined solids content is in the range of about 70% to 90% of the solids content of processed honey.

17. A gelling agent for honey, comprising: a mixture of about 5 parts to one part of low-methoxyl pectin per part of high-methoxyl pectin, and substantially free of supplemental acid or alkaline earth metal cations.

18. The gelling agent as recited in claim 17 wherein said mixture is about 4.5 parts to 1.5 parts low-methoxyl pectin per part of high-methoxyl pectin.

19. The gelling agent as recited in claim 17 wherein said mixture is about 4.5 parts to 2.5 parts of low-methoxyl pectin per part of high-methoxyl pectin.

20. A spreadable honey composition, comprising: honey, water sufficient to reduce the dextrose-water ratio to a level preventing crystallization, and an effective gelling amount of a pectin mixture consisting of a low-methoxyl pectin and a high-methoxyl pectin in a ratio in the range of from about 1 part low-methoxyl pectin to about 5 parts of a high-methoxyl pectin, said composition having an unadjusted pH of about 3.6 or below.

* * * * *